United States Patent Office 3,631,025
Patented Dec. 28, 1971

3,631,025
POLYOL MONO-(ACIDIC LIPID) ESTERS
James B. Martin, Hamilton, Ohio, assignor to The Procter & Gamble Company, Cincinnati, Ohio
No Drawing. Filed May 16, 1969, Ser. No. 825,409
Int. Cl. C07c 69/32
U.S. Cl. 260—234 R                            9 Claims

ABSTRACT OF THE DISCLOSURE

Novel polyol mono-(acidic lipid) esters are useful as emulsifiers, as frying fat antispatter additives, and as cake volume increasers. Examples of the novel compounds include 1,2-distearin succinatyl-1-glycerol, 1,2-distearin succinatyl-1-xylitol, 1,2-distearin succinatyl-1-sorbitol, 1-stearoyl propylene glycol succinatyl-1-sorbitol, and 1,2-distearin succinatyl sucrose.

BACKGROUND OF THE INVENTION

This invention relates to a new class of highly surface active lipids. These lipids are useful as emulsifiers and especially as food additives. They are especially useful as shortening or fat additives; for example, they can be used as antispatter agent additives for an all-purpose shortening or a frying fat. Moreover, they can be added to an all-purpose shortening or a shortening for use in cake production to increase the volume of baked cakes.

SUMMARY OF THE INVENTION

The compounds of this invention which have the above-described utility are novel polyol mono-(acidic lipid) esters.

DETAILED DESCRIPTION OF THE INVENTION

The novel compounds herein have the structural formula $$[R-\overset{O}{\underset{\|}{C}}-]_p[X][-\overset{O}{\underset{\|}{C}}(CH)_n\overset{O}{\underset{\|}{C}}-][Y][-H]_q$$

In this structural formula, [X] is either (i) a glycerol moiety having the structural formula $$\begin{bmatrix} -O-CH_2 \\ -O-CH \\ -O-CH_2 \end{bmatrix}$$

or (ii) a propylene glycol moiety having the structural formula $$\begin{bmatrix} -O-CH_2 \\ -O-CH \\ CH_3 \end{bmatrix}$$

When [X] is a glycerol moiety, $p$ is equal to 2; and when [X] is a propylene glycol moiety, $p$ is equal to 1.

In the above structural formula for the new compounds herein, R is an alkyl group containing from 11 to 21 carbon atoms. If there are two R groups in a particular molecule, each of these R groups can be the same or different.

In the above structural formula for the new compounds herein, $n$ is equal to 2 or 3.

In the above structural formula for the new compounds herein, [Y] is either (i) a linear polyol moiety having the structural formula $$\begin{bmatrix} -O-CH_2 \\ (-O-CH)_m \\ -O-CH_2 \end{bmatrix}$$

or (ii) a sucrose moiety having the structural formula $$\begin{bmatrix} -O-CH_2 & CH_2O- \\ & & \\ \text{(sucrose ring structure)} & \\ & & CH_2-O- \end{bmatrix}$$

When [Y] is a linear polyol moiety, $m$ is equal to 1 to 4 and $q$ is equal to $m$ plus 1; and when [Y] is a sucrose moiety, $q$ is equal to 7.

In the preferred compounds herein, R is an alkyl group containing from 15 to 17 carbon atoms, and if there is more than one R group in a particular molecule, each R group is the same. Moreover, in the preferred compounds of this invention $n$ is equal to 2 and [Y] is a linear polyol moiety with $m$ equal to 1, 3, or 4, or a sucrose moiety with $q$ equal to 7; and if [Y] is a linear polyol moiety, it is esterified at a primary hydroxyl.

The novel compounds herein have been described as polyol mono-(acidic lipid) esters. In order to make this terminology clear it is illustrated herein, by reference to the above-described structural formula. In the above-described structural formula the polyol residue is [Y]. It is mono esterified. The single ester group is an acidic lipid, namely $$[R-\overset{O}{\underset{\|}{C}}-]_p [X] [-\overset{O}{\underset{\|}{C}}(CH)_n\overset{O}{\underset{\|}{C}}-]$$

The fact that the rest of the hydroxyl sites are not esterified is reported in the above structural formula by $$[-H]_q$$

In further illustration of the above structural formula in the terminology herein, the structural formula of a particular compound within the scope of this invention is given hereinafter and particular chemical terminology is applied to its structural formula $$\begin{array}{c} \text{H}_2\text{C}-\text{O}-\overset{O}{\underset{\|}{C}}(\text{CH}_2)_2\overset{O}{\underset{\|}{C}}-\text{O}-\text{CH}_2 \\ \text{C}_{17}\text{H}_{35}\overset{O}{\underset{\|}{C}}-\text{O}-\text{CH} \quad\quad \text{CH}-\text{OH} \\ \quad\quad\quad\quad\quad\quad\quad\quad \text{CH}-\text{OH} \\ \text{C}_{17}\text{H}_{35}\overset{O}{\underset{\|}{C}}-\text{O}-\text{CH}_2 \quad\quad \text{CH}-\text{OH} \\ \quad\quad\quad\quad\quad\quad\quad\quad \text{CH}-\text{OH} \\ \quad\quad\quad\quad\quad\quad\quad\quad \text{CH}_2-\text{OH} \end{array}$$

1,2-distearin succinatyl-1-sorbitol

In this structure, $$\begin{array}{c} \text{H}_2\text{C}-\text{O}- \\ \text{C}_{17}\text{H}_{35}\overset{O}{\underset{\|}{C}}-\text{O}-\text{CH} \\ \text{C}_{17}\text{H}_{35}\overset{O}{\underset{\|}{C}}-\text{O}-\text{CH}_2 \end{array}$$

is a 1,2 distearin moiety, $$-\overset{O}{\underset{\|}{C}}(CH_2)_2\overset{O}{\underset{\|}{C}}-$$

is a succinatyl moiety; and $$\begin{array}{c} -\text{O}-\text{CH}_2 \\ \text{CH}-\text{OH} \\ \text{CH}-\text{OH} \\ \text{CH}-\text{OH} \\ \text{CH}-\text{OH} \\ \text{CH}_2-\text{OH} \end{array}$$

is a -1-sorbitol moiety.

Compounds having the structural formula given above for the novel compounds of this invention wherein [X] is a glycerol moiety and [Y] is a linear polyol moiety with $m$ equal to 1 and $q$ equal to 2 include, for example, 1,2-distearin succinatyl-1-glycerol, 1,3-distearin glutaratyl-1-glycerol, 1,3-distearin succinatyl-2-glycerol, 1,2-dipalmitin glutaratyl-2-glycerol, 1,2-dipalmitin succinatyl-1-glycerol, 1,3-dilaurin glutaratyl-2-glycerol, 1,2-dibehenin succinatyl-1-glycerol, and 1-stearoyl-2-palmitoyl glycerol succinatyl-1-glycerol.

Compounds having the structural formula given above for the novel compounds of this invention wherein [X] is a glycerol moiety and [Y] is a linear polyol moiety with $m$ equal to 2 and $q$ equal to 3 include, for example, 1,2-distearin succinatyl-1-erythritol, 1,3-distearin glutaratyl-2-erythritol, 1,2-dimyristyl glutaratyl-2-erythritol, 1-lauroyl-3-myristoyl succinatyl-1-erythritol, and 1,3-behenin glutaratyl-2-erythritol.

Compounds having the structural formula given above for the novel compounds of this invention wherein [X] is a glycerol moiety and [Y] is a linear polyol moiety with $m$ equal to 3 and $q$ equal to 4, include, for example, 1,2-distearin succinatyl-1-xylitol, 1,3-dipalmitin glutaratyl-2-xylitol, 1,2-diarachidin succinatyl-3-xylitol, 1,2-dilaurin glutaratyl-2-xylitol, and 1-stearoyl-3-behenoyl glycerol succinatyl-3-xylitol.

Compounds having the structural formula given above for the novel compounds of this invention wherein [X] is a glycerol moiety and [Y] is a linear polyol moiety with $m$ equal to 4 and $q$ equal to 5 include, for example, 1,2-dipalmitin succinatyl-1-sorbitol, 1,2-distearin succinatyl-1-sorbitol, 1,3-dilaurin glutaratyl-2-sorbitol, 1,2-dimyristin succinatyl-3-sorbitol, 1,3-dibehenin succinatyl-1-sorbitol, and 1-palmitoyl-3-stearoyl glycerol glutaratyl-1-sorbitol.

Compounds having the structural formula given above for the novel compounds of this invention wherein [X] is a glycerol moiety and [Y] is a sucrose moiety with $q$ equal to 7 include, for example, 1,2-distearin succinatyl sucrose, 1,3-distearin succinatyl sucrose, 1,2-dipalmitin glutaratyl sucrose, 1,3-dilaurin succinatyl sucrose and 1-behenoyl-2-stearoyl glycerol glutaratyl sucrose.

Compounds having the structural formula given above for the novel compounds of this invention wherein [X] is a propylene glycol moiety and [Y] is a linear polyol moiety with $m$ equal to 1 and $q$ equal to 2 include, for example, 1-stearoyl propylene glycol succinatyl-1-glycerol, 1-stearoyl propylene glycol glutaratyl-2-glycerol, 2-lauroyl propylene glycol succinatyl-1-glycerol, and 1-behenoyl propylene glycol glutaratyl-2-glycerol.

Compounds having the structural formula given above for the novel compounds of this invention wherein [X] is a propylene glycol moiety and [Y] is a linear polyol moiety with $m$ equal to 2 and $q$ equal to 3, include, for example, 1-stearoyl propylene glycol succinatyl-1-erythritol, 2-stearoyl propylene glycol glutaratyl-2-erythritol, 1-palmitoyl propylene glycol succinatyl-1-erythritol, 2-lauroyl propylene glycol glutaratyl-1-erythritol, and 1-behenoyl propylene glycol-2-erythritol.

Compounds having the structural formula given above for the novel compounds of this invention wherein [X] is a propylene glycol moiety and [Y] is a linear polyol moiety with $m$ equal to 3 and $q$ equal to 4 include, for example, 1-stearoyl propylene glycol succinatyl-1-xylitol, 2-myristoyl propylene glycol glutaratyl-2-xylitol, 1-lauroyl propylene glycol succinatyl-3-xylitol, 2-arachidoyl propylene glycol glutaratyl-2-xylitol and 1-behenoyl propylene glycol succinatyl-1-xylitol.

Compounds having the structural formula given above for the novel compounds of this invention wherein [X] is a propylene glycol moiety and [Y] is a linear polyol moiety with $m$ equal to 4 and $q$ equal to 5 include, for example, 1-stearoyl propylene glycol succinatyl-1-sorbitol, 2-palmitoyl propylene glycol succinatyl-2-sorbitol, 1-lauroyl propylene glycol glutaratyl-3-sorbitol, 1-behenoyl propylene glycol-1-sorbitol.

Compounds having the structural formula given above for the novel compounds of this invention wherein [X] is a propylene glycol moiety and [Y] is a sucrose moiety with $q$ equal to 7 include, for example, 1-stearoyl propylene glycol succinatyl sucrose, 1-palmitoyl propylene glycol glutaratyl sucrose, 2-lauroyl propylene glycol succinatyl sucrose, 1-myristoyl propylene glycol glutaratyl sucrose, 1-behenoyl propylene glycol succinatyl sucrose.

The compounds of this invention are conveniently prepared by monoacylating the appropriate polyol, $[Y][-H]_{q+1}$ [1], with an appropriate acidic lipid alkyl carbonate. This reaction can be carried out, for example, by adding the acidic lipid alkyl carbonate in benzene solution to the polyol dissolved in a mixture of pyridine and dimethylacetamide, maintaining this combination at 70° C' to 90° C. for a period of 2 to 4 hours, and then purifying to isolate the formed polyol mono-(acidic lipid) ester. The acidic lipid alkyl carbonate starting material is conveniently prepared as described in Thompson, U.S. Pat. 3,405,148, granted Oct. 8, 1968.

Turning now to the utility of these novel compounds, these compounds are very useful as emulsifying agents. For example they can be used for emulsifying the salad oil in water at levels of 0.5 weight percent to 2 weight percent, based on the weight of the salad oil.

Moreover, the novel compounds herein are very useful as antispatter agents for liquid or plastic shortenings which are suitable for frying purposes. When so used these agents are incorporated in a liquid or plastic shortening at a level ranging from 0.2% to 3%, by weight of the total shortening composition, preferably at a level ranging from 0.5% to 2% by weight of the total shortening composition.

The liquid shortenings referred to in the above paragraph are fluid or pumpable at room temperature. This is achieved by the use of a liquid fatty triglyceride base oil which is generally hydrogenated to an iodine value of 90 to 110, preferably 100–100. The liquid shortening can optionally contain minor amounts of higher melting triglycerides which are often denoted "hardstock."

The fatty triglyceride base oils can be any naturally occurring liquid triglyceride oil or liquid oil fraction derived from a naturally occurring material such as palm oil or tallow by graining or directed interesterification. Preferred examples of naturally occurring liquid triglyceride base oils are ground nut, cottonseed, soybean, rapeseed, olive, palm kernel, corn, sunflower, safflower, sesame seed, rice bran, wallflower, nasturtium seed, mustard seed, whale, sardine, herring, menhaden and pilchard oils.

The liquid shortenings referred to above are prepared by various known methods for making them fluid or pumpable at room temperature. In most instances, it is necessary and/or desirable to partially hydrogenate the liquid triglyceride base oils to maintain their flavor. This is particularly important when a naturally occurring oil is used and it has a high content of predominantly unsaturated fatty acids and a high iodine value. These liquid triglyceride base oils are generally partially hydrogenated to an iodine value of 90 to 110, preferably 100 to 110. Under no circumstances should the triglyceride base oils be hydrogenated beyond the point at which they are no longer fluid or pumpable at room temperature either before or after the addition of hardstock, i.e., either before or after the addition of high melting triglycerides which are substantially fully hydrogenated and are solid at room temperature.

High melting triglyceride solids or hardstock can be derived from any one of the triglyceride base oils named above by substantially fully hydrogenating the oil to an iodine value of less than 12, preferably less than 8. The hardstock can contain substantially fully saturated mono- and diglycerides as well as substantially fully saturated

[1] [Y] and $q$ are defined as hereinbefore.

triglycerides. The hardstock is admixed with the triglyceride base oil in amounts of 0% to 4.0%, generally 1.0% to 4.0%. The most generally preferred practice is to add the hardstock to the partially hydrogenated triglyceride base oil prior to processing the oil in the conventional manner which includes chilling and crystallization.

The novel compounds herein are useful as high temperature batter stabilizers. In this capacity they stabilize cake batter against component separation during baking and stabilize especially the foamy consistency and increased volume of the batter resulting from air incorporation during batter mixing. As a result, the use of a liquid shortening containing these novel high temperature batter stabilizers in combination with alpha-phase crystal-tending emulsifiers in cake preparation has been found to reduce the number of mixing stages required to incorporate air into the cake batter, to stabilize the batter during baking, and to produce baked cakes of increased volume, fine grain structure, and more tender eating quality.

When used as high temperature batter stabilizers the novel compounds herein are incorporated in a liquid shortening at levels ranging from 0.25% to 4% by weight of the total composition, preferably ranging from 0.5 to 3% by weight of the total composition. The amount of alpha-phase crystal-tending emulsifier which is present ranges from 0.5% to 15% by weight of the total composition.

The liquid shortening suitable for use together with the novel high temperature batter stabilizers herein and alpha-phase crystal-tending emulsifiers, can be the liquid shortening described above in the discussion about the use of these compounds as antispatter agents.

The alpha-phase crystal-tending emulsifiers useful for the purpose described above are to be distinguished from fatty materials having predominantly beta or beta-prime crystal-tending phases. These types of crystalline structures can be identified by their X-ray diffraction patterns and are described in an article by E. S. Lutton in the Journal of the American Chemical Society, vol. 67, page 524 (1945), and in Mitchell, U.S. Pats. 2,521,241–2, granted Sept. 5, 1950. The alpha crystalline form is the least stable, least dense, and lowest melting of these crystalline forms. The alpha-phase crystal-tending emulsifiers for use as described above are both lipophilic and hydrophilic and contain in the molecule at least one higher fatty acid group having from about 12 to about 22 carbon atoms and at least one free and unesterified hydroxyl group. The alpha-phase crystal-tending emulsifiers which can be used together with the novel compounds of this invention are the following classes of materials:

(a) A monoester of a straight chain aliphatic diol with a saturated fatty acid, said diol containing from 3 to 5 carbon atoms and said saturated fatty acid having from about 12 to about 22 carbon atoms, such as propylene glycol monostearate;

(b) A condensation product of a monohydroxy-monocarboxylic acid having from 2 to 6 carbon atoms with a partial fatty acid glyceride containing an average of from 1 to 2 fatty acid radicals having from about 12 to about 22 carbon atoms, such as monoglyceridyl lactate or lactostearin;

(c) A 1,3-diglyceride containing a saturated fatty acid having from about 16 to about 22 carbon atoms and a saturated fatty acid having from 2 to 4 carbon atoms, such as 1-acetyl-3-monostearin;

(d) A 1,2-diglyceride containing a saturated fatty acid having from about 16 to about 22 carbon atoms and a saturated fatty acid having from about 12 to about 18 carbon atoms, such as 1,2-distearin; and (e) A fatty acid monoester of diethylene glycol, said fatty acid having from about 12 to about 22 carbon atoms, such as diethylene glycol monostearate.

The following Examples I through VIII further illustrate the novel compounds herein and their preparation. These compounds have utility as emulsifiers for salad oils in water, as antispatter additives for shortenings, and as high temperature batter stabilizers to increase baked cake volume. Example IX shows the antispatter utility of compounds within the scope of the present invention. Example X shows the high temperature batter stabilizer utility of compounds within the scope of the present invention.

EXAMPLE I

Preparation of 1,2-distearin succinatyl-1-glycerol [2]

72.4 grams (0.1 mole) of 1,2-distearin hydrogen succinate (85% by weight 1,2-isomer and 15% by weight 1,3-isomer) and 20.2 grams (0.2 mole) triethyl amine are dissolved in 500 milliliters of benzene at 10° C. While this solution is being stirred, 21.8 grams (0.2 mole) ethyl chloroformate is added at a rate such that the temperature of the solution does not rise above 10° C. After the ethyl chloroformate has been added, stirring is continued for an additional 10 minutes. Then the resulting reaction mixture is added to a preheated (80° C.) solution of 92 grams (1.0 mole) glycerol in 200 milliliters pyridine and 200 milliliters dimethylacetamide. This addition is made in portions so that the reaction temperature does not fall below 70° C. The reaction mixture is then maintained at 80° C. for 3 hours. The reaction mixture is then allowed to cool. The cooled mixture is poured into water and then extracted several times with a 1:4 (volume ratio) chloroform-ethyl ether solution. The chloroform-ether extracts are washed with 10% hydrochloric acid until the washings are acidic, then with water until the washings are neutral. The washed solution is dried by stirring with anhydrous magnesium sulfate, then filtered, and then the solvents are evaporated. The residue is recrystallized twice from 1.5 liters of hexane, the first time at 5° C. and the second time at 21° C. A yield of 46.5 grams of product is obtained. Analysis indicates that the product is 98% pure distearin succinatyl glycerol. The predominant isomeric component in the product is 1,2-distearin succinatyl-1-glycerol. Approximately 75% by weight of the product is considered to be this isomer.

1,2-dilaurin succinatyl-1-glycerol is the predominant isomer prepared when an equivalent amount of 1,2-dilaurin hydrogen succinate is substituted for the 1,2-distearin hydrogen succinate above.

EXAMPLE II

Preparation of 1,3-distearin glutaratyl-1-glycerol [3]

39.5 grams (0.04 mole) 1,3-distearin hydrogen glutarate (98% 1,3-isomer) and 8.1 grams (0.08 mole) triethyl amine are dissolved in 200 milliliters benzene at 10° C. To this stirred solution at a rate such that the temperature does not rise above 10° C. is added 8.7 grams (0.08 mole) ethyl chloroformate. Stirring is continued for 10 minutes after completion of the addition of the ethyl chloroformate. The resulting reaction mixture is then added to a preheated (80° C.) solution of 37 grams (0.4 mole) glycerol in 80 milliliters pyridine and 80 milliliters dimethylacetamide. This addition is made in portions so that the reaction temperature does not fall below 70° C. Then the reaction mixture is maintained for 3 hours at 80° C. Purification is then carried out on the resulting mixture as in Example I to yield 23 grams of product. Analysis indicates this product to be 92% pure distearin glutaratyl glycerol. This product is deemed to be predominantly 1,3-distearin glutaratyl-1-

---

[2] A compound having the structural formula on Column 2 supra wherein [X] is a glycerol moiety, $p$ is equal to 2, each R is an alkyl group containing 17 carbon atoms, $n$ is equal to 2, [Y] is a linear polyol moiety, $m$ is equal to 1, and $q$ is equal to 2.

[3] A compound having the structural formula on Column 2 supra wherein [X] is a glycerol moiety, $p$ is equal to 2, each R is an alkyl group containing 17 carbon atoms, $n$ is equal to 3, [Y] is a linear polyol moiety, $m$ is equal to 1 and $q$ is equal to 2.

glycerol which is in admixture with a minor amount of -2-glycerol isomer.

1,3-dibehenin glutaratyl-1-glycerol is the predominant isomer prepared when an equivalent amount of 1,3-dibehenin hydrogen glutarate is substittued for the 1,3-distearin hydrogen glutarate above.

EXAMPLE III

Preparation of 1,2-distearin succinatyl-1-xylitol [4]

44 grams of 1,2-distearin succinatyl ethyl carbonate is added to 76 grams (0.5 mole) xylitol in 500 milliliters of pyridine at 50° C. The reactants are then stirred for 16 hours at 50° C. The product is transferred to a 2-liter separatory funnel with 500 milliliters of water and 500 milliliters of ethyl ether. The ether layer is washed twice with 10% hydrochloric acid and then four times with distilled water. The washed ether solution is dried by stirring with anhydrous magnesium sulfate, then filtered, then the solvent is removed by evaporation. The residue is recrystallized to yield 12.6 grams. Analysis shows this product to be approximately 90% pure distearin succinatyl xylitol. Further purification is carried out by column chromatography on 100 grams silica gel with 5% water to yield 4.9 grams. Analysis shows this product to be at least 95% pure distearin succinatyl xylitol. The product is considered to be predominantly 1,2-distearin succinatyl-1-xylitol with minor amounts of the -2-xylitol and -3-xylitol isomers being present.

1,2-distearin succinatyl-1-erythritol is prepared by substituting an equivalent amount of erythritol for the xylitol above.

EXAMPLE IV

Preparation of 1,2-distearin succinatyl-1-sorbitol [5]

36 grams (0.05 mole) 1,2-distearin hydrogen succinate (85% 1,2- and 15% 1,3-distearoyl isomeric esters of glycerol) and 10.1 grams (0.1 mole) triethyl amine are dissolved in 250 milliliters of benzene at 10° C. 10.9 grams of ethyl chloroformate is then added dropwise. Then the product is stirred 10 minutes. The resulting benzene solution of ethyl distearin succinatyl carbonate is then added to a solution of 91 grams (0.5 mole) sorbitol in 150 milliliters dimethylacetamide and 150 milliliters pyridine. The reactants are then heated with stirring at 80° C. for 3 hours. Purification of the resulting product gives 26.9 grams of distearin succinatyl sorbitol. Analysis shows the product to be more than 95% pure. The predominant isomer in the product is considered to be 1,2-distearin succinatyl-1-sorbitol with minor amounts of the -2-sorbitol and -3-sorbitol isomers also being present.

1-stearoyl-2-palmitoyl glycerol succinatyl-1-soribtol is formed by substituting an equivalent amount of 1-stearoyl-2-palmitoyl glycerol hydrogen succinate for the 1,2-distearin succiniate above.

EXAMPLE V

Preparation of 1,2-dipalmitin succinatyl-1-sorbitol [6]

34.4 grams (0.05 mole) 1,2-dipalmitin hydrogen succinate is substituted for the 36 grams (0.05 mole) 1,2-distearin hydrogen succinate in the precapatiin of Example IV. Purification of the resulting reaction mixture gives 23.8 grams of 1,2-dipalmitin succinatyl sorbitol. The predominant isomer in this product is 1,2-dipalmitin succinatyl-1-sorbitol with minor amounts of the -2-sorbitol and -3-sorbitol isomers also being present.

EXAMPLE VI

Preparation of 1,2-distearin succinatyl sucrose [7]

72.4 grams (0.1 mole) 1,2-distearin hydrogen succinate and 20.2 grams (0.2 mole) triethyl amine are mixed in one liter of benzene and cooled to 7° C. 21.7 grams (0.2 mole) ethyl chloroformate is then added slowly with mixing so that the temperature is maintained at 7° C. The product is stirred for 10 minutes after the addition is completed. The resulting solution of ethyl distearin succinatyl carbonate in benzene is added to a solution of 68.4 grams (0.2 mole) sucrose in one liter of pyridine preheated to 80° C. The rate of addition of benzene solution is slow enough to maintain the reactants at or above 70° C. After the addition the combination is maintained at 80° F. for 3 hours. The sample is then allowed to cool to room temperature. The cooled sample is diluted with one liter of water. The resulting mixture is extracted four times with 500 milliliter portions of 1 to 4 (by volume) combinations of n-butanol and ethyl acetate. Emulsions formed during this extraction are broken by warming in a hot water bath. The resulting extracts are washed with 10% hydrochloric acid until the washings are acidic. Then washing is carried out with water until the washings are neutral. The solution is dried by stirring with anhydrous magnesium sulfate, then filtered, then solvent is removed by evaporation.The product is crystallized from one liter of hexane at 10° C. and recrystallized from one liter of hexane at 21° C. A yield of 66.4 grams of 1,2-distearin succinatyl sucrose is obtained. Analysis shows this to be about 97% pure.

1,2-dimyristin glutaratyl sucrose is prepared when an equivalent amount of 1,2dimyristin hydrogen glutarate is substituted for the 1,2-distearin hydrogen succinate above.

In another case, 1,2-distearin succinatyl sucrose is prepared as follows: 24 grams (0.07 mole) sucrose and 12 grams (0.016 mole) 1,2-distearin succinate anhydride are added to 600 milliliters pyridine. To the sample is added 2 milliliters of 70% perchloric acid. This combination is stirred for one hour at 25° C. The reaction product is poured into 3 liters of water. This mixture is extracted once with one liter of chloroform followed by 4 extractions with 500 milliliter portions of 1:4 (by volume) butanol-ethyl acetate. The butanol-ethyl acetate extracts are dried with anhydrous sodium sulfate, filtered and evaporated. The residue is crystallized from hexane at 50° F. with recovery of 10 grams of product. The product is chromatographed on a 100 gram silica gel column with recovery of a 2-gram portion of well purified 1,2-distearin succinatyl sucrose.

EXAMPLE VII

Preparation of 1-stearoyl propylene glycol succinatyl-1-sorbitol [8]

91 grams (0.5 mole) sorbitol is dissolved in 350 milliliters pyridine with warming to 80° C. A solution of 0.05 mole 1-stearoyl propylene glycol succinatyl ethyl carbonate in 200 milliliters benzene is added slowly with stirring to the sorbitol solution. The reactants are stirred with heating at 80.° C. for 3 hours. The product is allowed to stand 20 hours at room temperature. Then it

---

[4] A compound having the structural formula on Column 2 supra wherein [X] is a glycerol moiety, $p$ is equal to 2, each R is an alkyl group containing 17 carbon atoms, $n$ is equal to 2, [Y] is a linear polyol moiety, $m$ is equal to 3 and $q$ is equal to 4.

[5] A compound having the structural formula on Column 2 supra wherein [X] is a glycerol moiety, $p$ is equal to 2, each R is an alkyl group containing 17 carbon atoms, $n$ is equal to 2, [Y] is a linear polyol moiety, $m$ is equal to 4 and $q$ is equal to 5.

[6] A compound having the structural formula on Column 2 supra wherein [X] is a glycerol moiety, $p$ is equal to 2, each R is an alkyl group containing 15 carbon atoms, $n$ is equal to 2, [Y] is a linear polyol moiety, $m$ is equal to 4 and $q$ is equal to 5.

[7] A compound having the structural formula on Column 2 supra wherein [X] is a glycerol moiety, $p$ is equal to 2, each R is an alkyl group containing 17 carbon atoms, $n$ is equal to 2, [Y] ie a sucrose moiety and $q$ is equal to 7.

[8] A compound having the structural formula on Column 2 supra wherein [X] is a propylene glycol moiety, $p$ is equal to 1, R is an alkyl group containing 17 carbon atoms, $n$ is equal to 2, [Y] is a linear polyol moiety, $m$ is equal to 4 and $q$ is equal to 5.

is diluted with 500 milliliters of ethyl ether and washed 4 times with 500 milliliter portions of 20% hydrochloric acid. The organic layer is then water washed until it is neutral. Emulsions forming during the washing treatment are broken by warming the mixture in a warm water bath. The organic layer is dried by stirring with anhydrous magnesium sulfate, filtered and then the solvent is evaporated. The residue is crystallized from 200 milliliters of hexane at 10° C. and recrystallized from hexane at 21° C. A yield of 15.8 grams is obtained. The product is about 95% pure 1-stearoyl propylene glycol succinatyl sorbitol. The predominant isomer is considered to be 1-stearoyl propylene glycol succinatyl-1-sorbitol with minor amounts of the -2-sorbitol and -3-sorbitol isomers also being present.

1-stearoyl propylene glycol succinatyl - 1 - xylitol is formed by substituting an equivalent amount of xylitol for the sorbitol above. In like manner 1-stearoyl propylene glycol succinatyl-1-erythritol is formed by substituting an equivalent amount of erythritol for the sorbitol above. And 1-stearoyl propylene glycol succinatyl-1-glycerol is formed by substituting an equivalent amount of glycerol for the sorbitol above.

2-lauroyl propylene glycol glutaratyl - 1 - sorbitol is formed by substituting an equivalent amount of 2-lauroyl propylene glycol succinatyl ethyl carbonate for the 1-stearoyl propylene glycol succinatyl ethyl carbonate above.

EXAMPLE VIII

Preparation of 1-stearoyl propylene glycol succinatyl sucrose [9]

44.2 grams (0.1 mole) 1-stearoyl propylene glycol hydrogen succinate and 30.3 grams triethylamine are dissolved in 800 milliliters benzene. The solution is cooled to 8° C., then 32.6 grams of ethyl chloroformate is added slowly with stirring. The sample is stirred 45 minutes after the addition of the ethyl chloroformate to form 1-stearoyl propylene glycol succinatyl ethyl carbonate. 68.4 grams (0.2 mole) sucrose is dissolved in 1 liter of pyridine, and the solution is heated to 40° C. Then the 1-stearoyl propylene glycol succinatyl ethyl carbonate solution is added to the sucrose solution with the temperature maintained at 38° C. The reaction is then continued for 16 hours with stirring and heating at 37° C. Product is then isolated utilizing the procedure for isolation described in Example VII except that both crystallizations are performed at −7° C. from hexane with 3% ethanol added. A yield of 28.3 grams of product is obtained. The product is over 98% pure 1-stearoyl propylene glycol succinatyl sucrose.

1-behenoyl propylene glycol glutaratyl sucrose is prepared by substituting an equivalent amount of 1-behenoyl propylene glycol glutaratyl ethyl carbonate for the 1-stearoyl propylene glycol succinatyl ethyl carbonate above.

EXAMPLE IX

Utility as antispatter agents

The antispatter effectiveness of compounds within the scope of this invention is tested as follows:

First the compound to be tested is added to and admixed with a plastic vegetable base shortening.

The shortening containing the antispatter additive is tested for splattering in either a "Water Injection Spatter Test" or in a "Steak Frying Spatter Test."

In the "Water Injection Spatter Test" 20 grams of the shortening containing the antispatter additive is placed in a 400 milliliter beaker. 12 square centimeters of filter paper is attached over the top opening of the beaker above the shortening as a spatter detector. The shortening is then maintained at 205° C. on a hot plate. To the shortening at 205° C. in the beaker is added 0.2 milliliter of water. The water is inserted through the filter paper spatter detecter into the heated shortening. The amount of shortening spattered onto the detector in 0.5 minute as a result of the water addition, is determined. This is compared with the amount of spatter from shortening tested the same but containing no antispatter additive.

In the "Steak Frying Spatter Test" 10 grams of the shortening containing the antispatter additive is placed in a one-liter beaker which has been modified by being cut down to a height of 3 centimeters. 46 square centimeters of filter paper is attached as a collar about the modified beaker to act as a spatter detector. The shortening in the beaker is maintained at 200° C. To the shortening in the beaker is added 20 grams of steak (cut to be approximately 0.5 inch thick by 1.75 inches by 1.75 inches). The steak is fried in the beaker for 4 minutes. After the first 2.5 minutes, the steak is turned. After 4 minutes the filter paper spatter detector is removed and the amount of spatter on the detector is determined. This amount is compared with the amount of spatter from shortening tested the same but containing no antispatter additive.

Test results are shown in the following table. In the table where more than one result is indicated, the test has been carried out a number of times.

TABLE I

| Additive | Concentration of additive in shortening (weight percentage) | Water spatter test (grams spatter) | Steak frying spatter test (grams spatter) |
| --- | --- | --- | --- |
| 1-stearoyl propylene glycol succinatyl-1-sorbitol | 1 | 0.06 | |
|  | 0.5 | 0.71 | 0.7 |
|  |  |  | 0.3 |
|  |  |  | 0.3 |
|  | 0.25 |  | 2.1 |
|  |  |  | 3.7 |
|  |  |  | 5.3 |
| 1,2-distearin succinatyl-1-sorbitol | 2 | 0.48 | |
|  | 1 | 1+ | |
| 1,3-distearin glutaratyl-1-sorbitol | 1 | 0.96 | |
| 1,2-distearin succinatyl sucrose | 1 | 1+ | 0.7 |
|  |  |  | 1.7 |
|  |  |  | 2.3 |
| Control |  | 1+ | 1.9 |
|  |  |  | 2.7 |
|  |  |  | 3.3 |
|  |  |  | 5.5 |
|  |  |  | 6.0 |

[9] A compound having the structural formula on Column 2 supra wherein [X] is a propylene glycol moiety, $p$ is equal to 1, R is an alkyl group containing 17 carbon atoms, $n$ is equal to 2, [Y] is a sucrose moiety, and $q$ is equal to 7.

The above tests indicate that the compounds of the present invention are effective antispatter additives for shortening in that they substantially reduce the amount of spatter from the shortening when it is used for frying.

EXAMPLE X

Utility as high temperature batter stabilizers

The high temperature batter stabilizer effectiveness of compounds within the scope of this invention is tested as follows:

First, the compound to be tested is added to and admixed with refined and deodorized cottonseed oil shortening and propylene glycol monostearate (PGMS—an alpha phase crystal-tending emulsifier) to form a shortening composition containing by weight 2% of a compound within the scope of this invention, 14% PGMS and the remainder cottonseed oil.

White cakes are then prepared utilizing the shortening compositions. These cakes are prepared from the following ingredients.

| Ingredients: | Parts by wt., grams |
|---|---|
| Granulated sugar | 206 |
| Cake flour | 203 |
| Shortening composition | 57 |
| Dextrose | 16.8 |
| Nonfat milk solids | 24.4 |
| Salt | 4 |
| Double-acting baking powder | 7.5 |
| Vanilla | 1.3 |
| Egg whites, fresh | 60 |

The shortening and egg whites are added to a mixture of the rest of the ingredients and then 300 milliliters of water mixed in with an electric mixer at 500 r.p.m. for 4 minutes to provide a batter. 400 grams of batter is placed in an 8-inch round pan and baked at 360° F. for about 25 minutes. The cake volume 20 minutes after removal of the cake from the oven is measured.

Test results involving compounds within the scope of the present invention are shown in the following table.

TABLE II

| Additive: | Cake volume [1] |
|---|---|
| 1,2-distearin succinatyl-1-glycerol | 1080 |
| 1,2-distearin succinatyl-1-sorbitol | 1470 |
| 1,2-distearin succinatyl sucrose [2] | 1530 |
| 1,2-distearin succinatyl-1-xylitol | 1325 |
| 1-stearoyl propylene glycol succinatyl-1-sorbitol | 1425 |
| 1-stearoyl propylene glycol succinatyl sucrose | 1290 |
| Control (100% cottonseed oil) | Aprox. 1000 |
| Control (86% by weight cottonseed oil, 14% by weight PGMS) | 930 |

[1] 20 minutes after removal of the cake from the oven—cubic centimeters/400 grams.
[2] Used in shortening at the 1% level rather than at the 2% level.

The above tests indicate that the compounds of this invention are effective high temperature batter stabilizers. In other words, the use of a liquid shortening containing these novel compounds in combination with alpha phase crystal-tending emulsifiers in cake preparation produces baked cakes of substantially increased volume.

Similar results of increased baked cake volume are achieved when other alpha phase crystal-tending emulsifiers replace PGMS in the above example, i.e. when lactostearin, 1-acetyl-3-monostearin, 1,2-distearin or diethylene glycol monostearate replace PGMS in the above example.

What is claimed is:

1. Polyol mono-(acidic lipid) esters having the structural formula $$[R-\overset{O}{\underset{\|}{C}}-]_q[X][-\overset{O}{\underset{\|}{C}}(CH)_n\overset{O}{\underset{\|}{C}}-][Y][-H]_q$$

wherein
(a) [X] is either (i) a glycerol moiety having the structural formula $$\begin{bmatrix} -O-CH_2 \\ -O-CH \\ -O-CH_2 \end{bmatrix}$$

or (ii) a propylene glycol moiety having the structural formula $$\begin{bmatrix} -O-CH_2 \\ -O-CH \\ CH_3 \end{bmatrix}$$

(b) when [X] is a glycerol moiety, $p$ is equal to 2; and when [X] is a propylene glycol moiety, $p$ is equal to 1,
(c) R is an alkyl group containing from 11 to 21 carbon atoms;
(d) $n$ is equal to 2 or 3
(e) [Y] is either (i) a linear polyol moiety having the structural formula $$\begin{bmatrix} -O-CH_2 \\ (-O-CH)_m \\ -O-CH_2 \end{bmatrix}$$

or (ii) a sucrose moiety having the structural formula

[sucrose structural formula]

and
(f) when [Y] is a linear polyol moiety, $m$ is equal to 1 to 4 and $q$ is equal to $m$ plus 1; and when [Y] is a sucrose moiety, $q$ is equal to 7.

2. The novel polyol mono-(acidic lipid) esters of claim 1 wherein R is an alkyl group containing from 15 to 17 carbon atoms, and if there is more than one R group in a particular molecule, each R group is the same.

3. The novel polyol mono-(acidic lipid) esters of claim 2 wherein $n$ is equal to 2.

4. The novel polyol mono-(acidic lipid) esters of claim 3 wherein [Y] is a linear polyol moiety with $m$ equal to 1, 3, or 4, or a sucrose moiety with $q$ equal to 7; and if [Y] is a linear polyol moiety, it is esterified at a primary hydroxyl.

5. The novel polyol mono-(acidic lipid) esters of claim 4 wherein [X] is a glycerol moiety, each R is an alkyl group containing 17 carbon atoms, [Y] is a linear polyol moiety, $m$ is equal to 3 and $q$ is equal to 4.

6. The novel polyol mono-(acidic lipid) esters of claim 4 wherein [X] is a glycerol moiety, each R is an alkyl group containing 17 carbon atoms, [Y] is a linear polyol moiety, $m$ is equal to 4, and $q$ is equal to 5.

7. The novel polyol mono-(acidic lipid) esters of claim 4 wherein [X] is a glycerol moiety, each R is an alkyl group containing 17 carbon atoms, [Y] is a sucrose moiety and $q$ is equal to 7.

8. The novel polyol mono-(acidic lipid) esters of claim 4 wherein [X] is a propylene glycol moiety, R is an alkyl group containing 17 carbon atoms, [Y] is a linear polyol moiety, $m$ is equal to 4 and $q$ is equal to 5.

9. The novel polyol mono-(acidic lipid) esters of claim 4 wherein [X] is a propylene glycol moiety, R is an alkyl group containing 17 carbon atoms, [Y] is a sucrose moiety and $q$ is equal to 7.

References Cited

UNITED STATES PATENTS

| 2,927,919 | 3/1960 | Anderson | 260—234 |
| 3,459,733 | 8/1969 | Byrd, Jr. et al. | 260—234 |

LEWIS GOTTS, Primary Examiner

J. R. BROWN, Assistant Examiner

U.S. Cl. X.R.

99—1, 118 G, 118 F; 260—404.8, 410.7

UNITED STATES PATENT OFFICE
CERTIFICATE OF CORRECTION

Patent No. 3,631,025      Dated December 28, 1971

Inventor(s) James B. Martin

It is certified that error appears in the above-identified patent and that said Letters Patent are hereby corrected as shown below:

Column 2, line 55, in the formula, "CH" should be in the position of the second "O" which should be deleted Column 11, line 66, "$[R-\overset{\overset{O}{\|}}{C}-]_q$" should read -- $[R-\overset{\overset{O}{\|}}{C}-]_p$ Signed and sealed this 12th day of September 1972.

(SEAL)
Attest:

EDWARD M. FLETCHER, JR.
Attesting Officer

ROBERT GOTTSCHALK
Commissioner of Patents